United States Patent [19]
Kim

[11] Patent Number: 5,916,141
[45] Date of Patent: Jun. 29, 1999

[54] TANDEM MASTER CYLINDER OF BRAKE SYSTEM IN AN AUTOMOBILE

[75] Inventor: Yoon Taek Kim, Kyungki-do, Rep. of Korea

[73] Assignee: Hyundai Motor Company, Seoul, Rep. of Korea

[21] Appl. No.: 08/701,098

[22] Filed: Aug. 21, 1996

[30] Foreign Application Priority Data

Aug. 21, 1995 [KR] Rep. of Korea .................. 95-25645

[51] Int. Cl.⁶ ............................................ B60T 11/20
[52] U.S. Cl. ........................... 60/562; 60/563; 60/574; 60/591; 188/349; 303/9.62
[58] Field of Search ........................... 60/562, 563, 564, 60/574, 591; 303/9.62, 9.75; 188/349

[56] References Cited

U.S. PATENT DOCUMENTS

| | | | |
|---|---|---|---|
| 3,147,042 | 9/1964 | Stelzer | 60/574 |
| 3,210,941 | 10/1965 | Stelzer | 60/562 |
| 4,072,012 | 2/1978 | Kawakami | 60/562 |
| 4,499,729 | 2/1985 | Gaiser | 60/578 |

*Primary Examiner*—F. Daniel Lopez
*Attorney, Agent, or Firm*—Birch, Stewart, Kolasch & Birch, LLP

[57] ABSTRACT

A tandem master cylinder comprising first and second oil chambers having first and second pistons and first and second springs disposed in each of said respective chambers, the second piston being connected with a hydraulic push rod; a bypass chamber; and two one-way valve means mounted at one side of the bypass tube and in the body of the first piston for establishing one-way oil flow passage from the second chamber to the first chamber and then to the second chamber. The tandem master cylinder allows the braking power increasing ratio between the front wheels and the rear wheels to follow a nonlinear curve for improving braking efficiency.

4 Claims, 2 Drawing Sheets

FIG. 3A
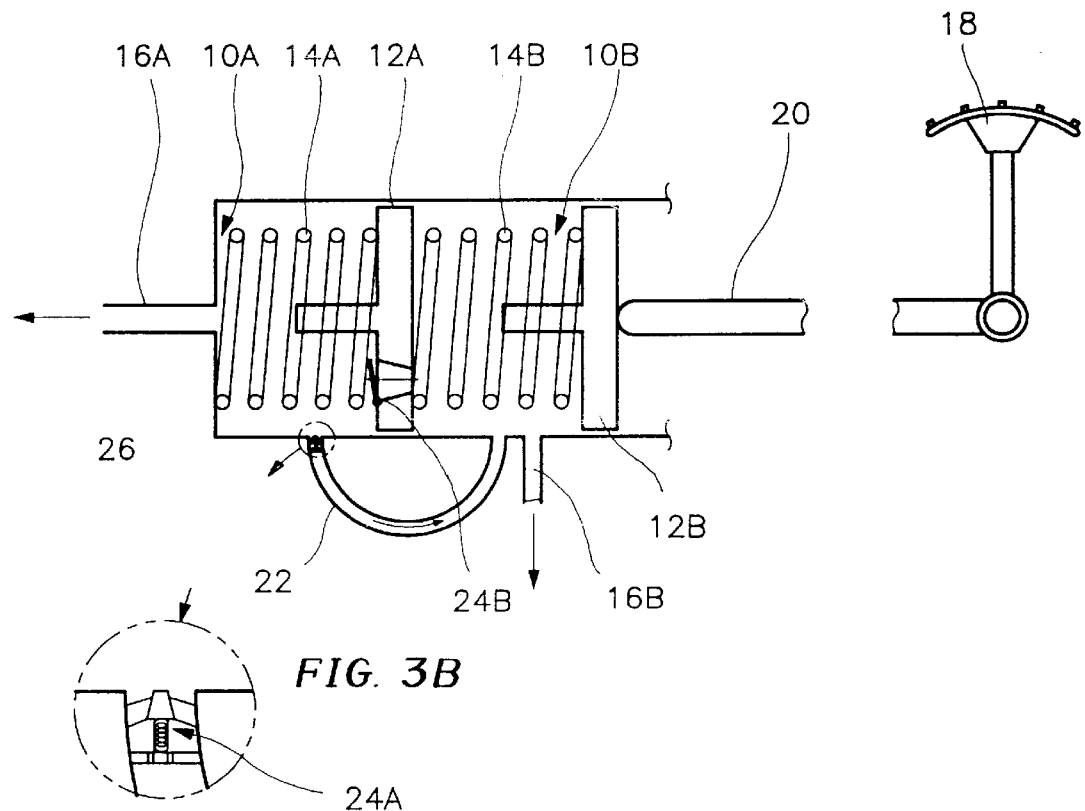
FIG. 3B
FIG. 4
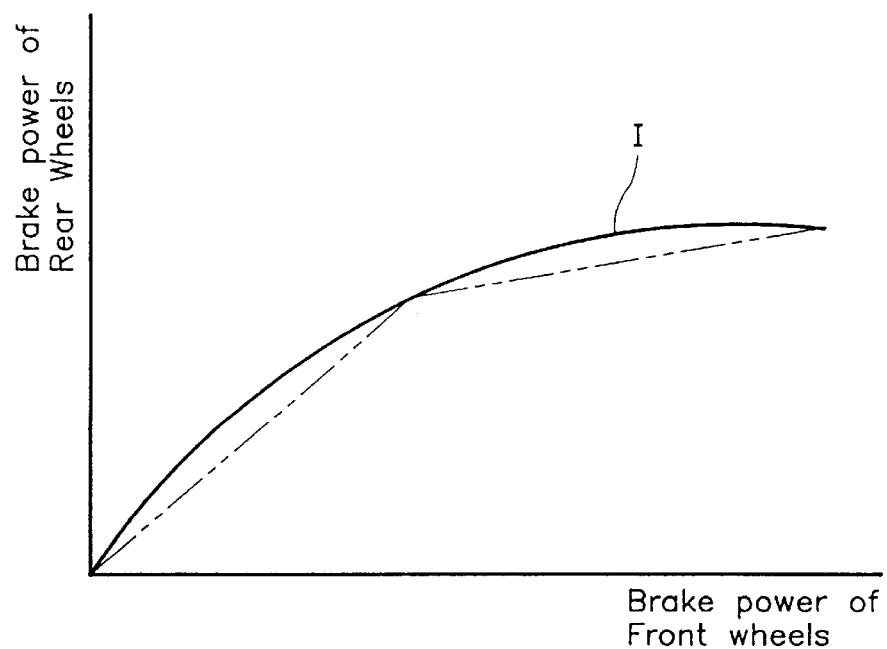

TANDEM MASTER CYLINDER OF BRAKE SYSTEM IN AN AUTOMOBILE

BACKGROUND OF THE INVENTION

1. Field of the Invention

The present invention relates to a master cylinder of a brake system in an automobile and, more particularly, to a tandem master cylinder configured to have the braking power increasing ratio between the front wheels and the rear wheels follow a nonlinear curve for improving the braking efficiency of the automobile.

2. Description of the Prior Art

Nowadays, most passenger cars using a hydraulic brake system adopts safety devices such as a dual brake system and an anti-skid brake system (ABS). Also, the dual brake system adopts a tandem master cylinder, a safety cylinder and a pressure differential warning valve. As is well known, the tandem master cylinder has two hydraulic cylinders coupled in series in order to divide the hydraulic circuit of brake system into front and rear wheel sides.

A conventional tandem master cylinder is represented by FIG. 1, having two hydraulic cylinders coupled in series. The device comprises a first chamber 10A and a second chamber 10B, charging brake oil, a first piston 12A and a second piston 12B constituting one side of each chamber, and a first spring 14A and a second spring 14B disposed in each chamber. Also, a first hydraulic port 16A leading to the rear wheel cylinders is formed at the first chamber 10A and a second hydraulic port 16B leading to the front wheel cylinders is formed at the second chamber 10B. Connected at the second piston 12B is a hydraulic push rod 20 of a brake booster, which is coupled to the brake pedal 18 in a well known manner.

When the automobile driver operates the brake pedal 18, the push rod 20 pushes the second piston 12B to compress the brake oil (hereinafter called oil) and the second spring 14B in the second chamber 10B. Simultaneously, the second spring 14B urges the first piston 12A to compress the oil and the first spring 14A in the first chamber 10A. Thus, the oil in each chamber 10B and 10A is transferred from the second port 16B and the first port 16A to the front wheel cylinders and the rear wheel cylinders, respectively, through each brake line.

Midway in the rear wheel brake line, a proportioning valve 26 (hereinafter p-valve) is provided as the anti-skid brake system, which reduces the oil pressure increasing rate of the rear wheel cylinders compared with the front wheel cylinders, as the brake power is increased. This prevents the rear wheels from skidding when braking the automobile.

The p-valve 26 is not operated at the initial stage of braking, however, it is operated when the oil pressure at the hydraulic port 16A to rear wheel cylinders is increased to a predetermined level, to reduce the increasing rate of the brake power of the rear wheels.

As can be seen in the graph of FIG. 2, if brake power is continuously increased, the brake power (oil pressure) for both the front wheels and the rear wheels is increased at almost the same rate, following a linear slope to the operating point of the p-valve. After this, the increasing rate follows another linear slope which is less than the first one, due to the operation of the p-valve.

However, since the above change of oil pressure is effected between two linear slopes, and the change occurs abruptly at the operating point of the p-valve, it is found that the braking power or performance of the automobile is not effective and that frequent changes in the oil pressure weakens the mechanical parts of the p-valve as well as components of the rear wheel brake.

SUMMARY OF THE INVENTION

The present invention is intended to overcome the above drawbacks of the conventional hydraulic brake system.

Therefore, it is an object of the present invention to provide a novel structure of tandem master cylinder, which is capable of having oil pressure increasing rate which is applied to both front and rear wheels, follow a nonlinear curve, without using the proportioning valve.

In achieving the above object, the present invention resides in using a tandem master cylinder comprising a first chamber and a second chamber, charging brake oil, and a first hydraulic port communicating with the rear wheel cylinders and a second hydraulic port communicating with the front wheel cylinders; a first piston and a second piston disposed in each chamber and constituting one side of each chamber, said second piston being connected to a hydraulic push rod of the brake booster, which in turn, is coupled to the brake pedal; a first spring and a second spring disposed in the first and second chamber, respectively; a bypass tube provided between one side of the first chamber and one side of the second chamber; and a one-way valve means mounted in both the bypass tube and in the body of the first piston, to establish a one-way oil flow passage from the second chamber to the first chamber and then to the second chamber.

In a preferred embodiment of the present invention, the first spring and the second spring have material characteristics such that the elastic modulus of the first spring is greater than that of the second spring, and the elastic modulus of the first spring has a nonlinear constant value.

BRIEF DESCRIPTION OF THE DRAWINGS

The above object and features of the present invention will become more apparent by describing in detail the preferred embodiment of the present invention with reference to the attached drawings in which:

FIG. 3A is a schematic representation of a tandem master cylinder configured in accordance with the present invention;

FIG. 3B is an enlarged view of the one-way valve provided in the bypass passage; and FIG. 4 is a view similar to FIG. 2, showing the braking power interrelationship in accordance with the present invention.

DETAILED DESCRIPTION OF THE PREFERRED EMBODIMENT

Referring to FIG. 3A, there is shown a tandem master cylinder of the present invention. Briefly, the tandem master cylinder 10 of the present invention has the same configuration as that of FIG. 1, except for a bypass passage 22 provided between the first chamber 10A and the second chamber 10B, and one-way valve means 24A and 24B mounted in the bypass passage 22 and in the body of the first piston 12A, respectively, in order to establish an oil flow passage from the second chamber 10B to the first chamber 10A and then to the second chamber 10B.

Figure 1:
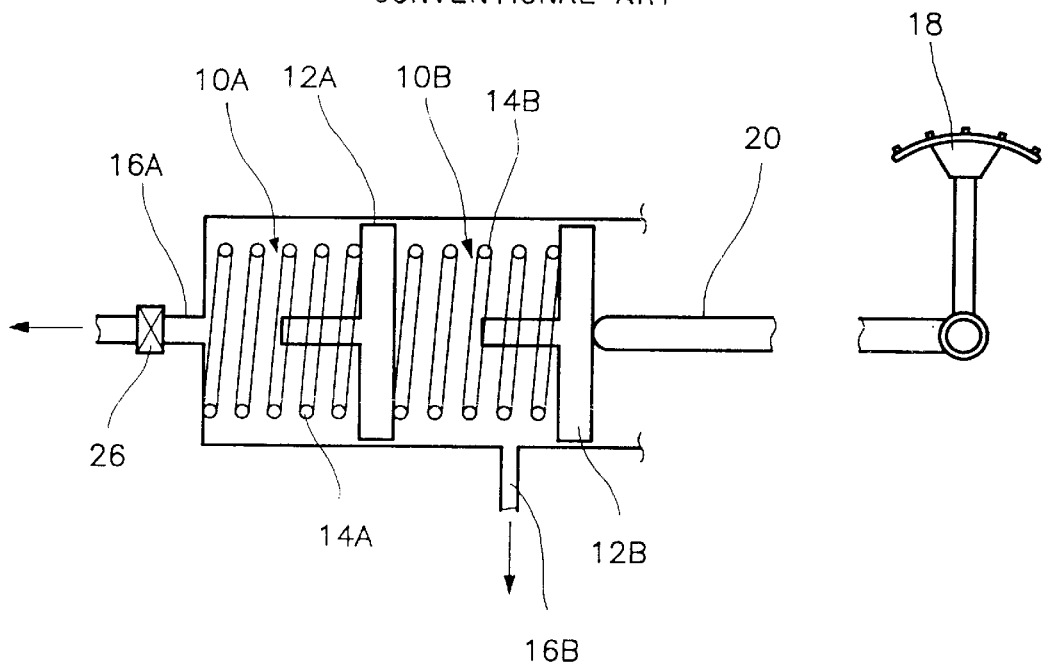
FIG. 1 is a schematic representation of a typical tandem master cylinder of a brake system.
Figure 2:
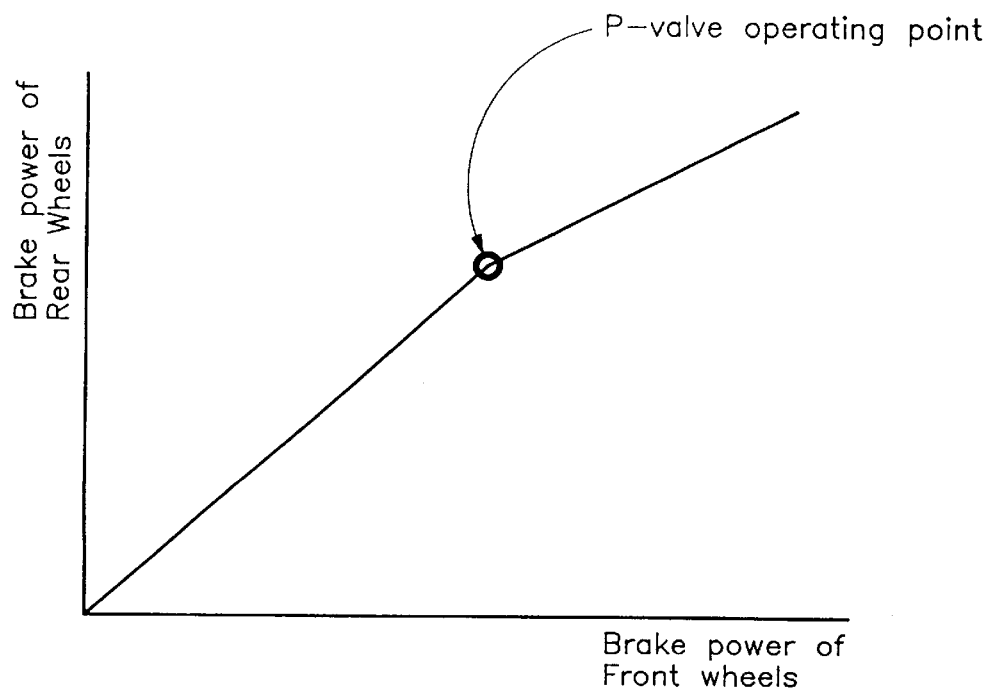
FIG. 2 is a graph representing the interrelationship of the brake power increasing rate applied to the front wheels and the rear wheels of an automobile in accordance with a conventional brake system.

Similarly to the tandem master cylinder shown in FIG. 1, the first chamber 10A and the second chamber 10B charge brake oil, and the first piston 12A and the second piston 12B constitute one side of each chamber 10A and 10B.

The springs 14A and 14B are disposed in each chamber 10A and 10B. Also, a first hydraulic port 16A communicating with the rear wheel cylinders is formed at the first chamber 10A, and a second hydraulic port 16B communicating with the front wheel cylinders is formed at the second chamber 10B. A hydraulic plush rod 20 of the brake booster (not shown) which is coupled to the brake pedal 18, is connected with the outer surface of the second piston 12B.

As shown in the detail in enlarged circle portion of FIG. 3B, the one-way valve 24A of the bypass tube 22, and the one-way valve 24B of the first piston 12A may use any typical check valves of proper construction. Preferably, the one-way valve 24A of the bypass tube 22 is mounted near one side of the first chamber 10A.

In particular, the springs 14A and 14B have material characteristics such that the elastic modulus of the first spring 14A is greater than that of the second spring 14B. Also, the elastic modulus of the first spring 14A has a nonlinear spring constant value K.

Also, both ends of the bypass tube 22, which connect to chambers 10A and 10B respectively, are located such that the ends connect with the volumes of each chamber although the volumes change in accordance with the movement of each piston 12A and 12B.

With this arrangement, when the driver works the brake pedal 18, the hydraulic push rod 20 of brake booster pushes the second piston 12B and the piston 12B compresses the second spring 14B and the brake oil in the second chamber 10B.

Also, the first piston 12A compresses the first spring 14A and oil in the first chamber 10A by the compression force of the spring 14B and the oil in the second chamber 10B.

The compressed oil in the above chambers 10B and 10A are simultaneously supplied to the front wheel cylinders and the rear wheel cylinders, respectively, through each brake line by the compression of each piston 12B and 12A, respectively.

When the braking becomes large, the oil pressure in the first chamber 10A becomes higher than the preset pressure of the one-way valve 24A of the bypass tube 22, and the oil in the first chamber 10A flows into the second chamber 10B through the bypass tube 22. Thus, the oil pressure in the second chamber 10B becomes higher than that in the first chamber 10A and this results in a nonlinear change in the brake power at both the front and rear wheels.

It should be noted that the compression ratio of the brake oils generated in the first chamber 10A and the second chamber 10B shows nonlinear characteristics, since the first piston 12A freely moves and the first spring 14A has a greater nonlinear elastic modulus than that of the second spring 14B.

Once the automobile driver releases the brake pedal 18, the one-way valve 24B in the first piston 12A is opened by the pressure difference between the two chambers, and the oil flows from the second chamber 10B to the first chamber 10A, thereby permitting the pressure in each chamber to return to their initial state.

In referring to the graph of FIG. 4, it can be seen that the brake oil pressure (brake power) increasing rate for the front wheels is far greater than that for the rear wheels, and the curve I according to the present invention represents the nonlinear interrelationship of the braking power between the front and the rear wheels.

As will be apparent from the foregoing description, the tandem master cylinder of the present invention can change the brake power increasing rate for the front and the rear wheels in a nonlinear manner, whereby the brake power of an automobile can be effectively enhanced and the mechanical life of components of the brake system can be considerably extended. Further, according to the present invention, there is the advantage of reducing components such as the proportioning valve (p-valve) commonly used in the brake system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tandem master cylinder comprising:
    a first chamber having a first hydraulic port connected to rear wheel cylinders, and a first piston and a first spring disposed therein to form one side of said first chamber;
    a second chamber having a second hydraulic port connected to front wheel cylinders, and a second piston and second spring disposed therein to form one side of said second chamber, said second piston being connected with a push rod of a brake booster coupled to a brake pedal;
    a bypass tube provided between said first and second chambers, with a one-way valve provided in the bypass tube to establish a one-way flow from said second chamber to said first chamber; and
    a one-way valve mounted in said first piston, to establish a one-way flow from said first chamber to said second chamber.

2. The tandem master cylinder of claim 1, wherein the one-way valve of the bypass tube is mounted near one side of the first chamber.

3. The tandem master cylinder of claim 1, wherein the first spring and the second spring have a material characteristics such that the elastic modulus of the first spring is greater than that of the second spring, and the elastic modulus of the first spring has a nonlinear spring constant value.

4. The tandem master cylinder of claim 1, wherein said bypass tube has a first end and a second end located such that said first and second ends are always fluidly connected to said first and second chambers, respectively.

\* \* \* \* \*